United States Patent
Rathgeb

[11] 3,903,099
[45] Sept. 2, 1975

[54] CERTAIN 2-HALO-5-THIO-1,3,4-THIADIAZOLES

[75] Inventor: Paul Rathgeb, Basel, Switzerland

[73] Assignee: Ciba-Geigy Corporation, Ardsley, N.Y.

[22] Filed: Apr. 4, 1973

[21] Appl. No.: 347,744

Related U.S. Application Data

[63] Continuation of Ser. No. 177,168, Sept. 1, 1971, abandoned.

[30] Foreign Application Priority Data
Sept. 4, 1970 Switzerland.................... 13279/70

[52] U.S. Cl..... 260/302 SD; 260/306.8 D; 424/200; 424/270
[51] Int. Cl............................................ C07d 91/62
[58] Field of Search.............................. 260/302 SD

[56] References Cited
UNITED STATES PATENTS
3,090,721  5/1963  Uhlenbroek et al.......... 260/302 SD
3,159,644  12/1964  Stephens...................... 260/302 SD
3,562,284  2/1971  Newman et al............... 260/302 SD

OTHER PUBLICATIONS
Cason, Essential Principles of Organic Chemistry, Prentice–Hall, Engelwood Cliffs, N.J., 1956, pp. 314–317.
Newman et al., Chem. Abstracts, 70: 37738 (1968).

*Primary Examiner*—Richard J. Gallagher

[57] ABSTRACT

Compounds of the formula

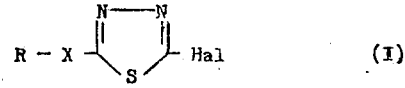

in which R represents an alkyl radical optionally substituted by halogen or alkoxy, an alkenyl radical optionally substituted by halogen or represents a cycloalkyl radical, X represents sulphur, the sulphinyl or sulphonyl group, and Hal represents chlorine or bromine are useful in combating soil nematodes, soil fungi and insects or development stages of insects which live in the soil.

1 Claim, No Drawings

CERTAIN 2-HALO-5-THIO-1,3,4-THIADIAZOLES

This is a continuation of application Ser. No. 177,168, filed on Sept. 1, 1971, now abandoned.

This invention relates to novel 2-halo-1,3,4-thiadiazoles, processes for their manufacture and a means and method combating pests arising in the soil.

According to the present invention there are provided 2-halo-1,3,4-thiadiazoles of general formula I:

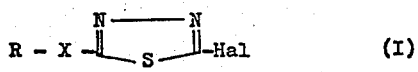

wherein R is an alkyl group optionally substituted by halogen or alkoxy, an alkenyl groups optionally substituted by halogen or is a cycloalkyl group, X is sulphur, sulfinyl or sulfonyl, and Hal is chlorine or bromine.

In this formula, R is preferably a low, straight or branched-chain alkyl group having 1 to 6 carbon atoms, for example methyl, ethyl, propyl, isopropyl, n-butyl, sec-butyl, isobutyl, tert.-butyl, pentyl, isopentyl, etc., as well as n-hexyl and its isomers. Any alkoxy group which is a substituent of an alkyl group R preferably has 1 to 4 carbon atoms. Allyl and methallyl are preferred alkenyl groups. The preferred halogen substituent for alkyl or alkenyl groups is chlorine. The preferred halogen substituted alkenyl radical is the chloroalkyl radical. Cycloalkyl groups R preferably have 5 to 7 carbon atoms, cyclopentyl being most preferred.

The novel 2-halo-1,3,4-thiadiazoles of formula I can be made according to the present invention by diatozing a 2-amino-1,3,4-thiadiazole of formula II

in the presence of a hydrogen halide with an alkali nitrite, treating the diazonium halide formed with copper or copper salts and if desired oxidising with an oxidising agent for the purpose of transforming the thio-bridge member into the sulfinyl or sulfonyl group.

The formula II, R has the same meaning as in formula I.

For the diazotization hydrogen bromide and hydrogen chloride are useful as the hydrogen halide. They are preferably used in the form of a concentrated aqueous solution in the reaction: hydrobromic acid = 48 percent; hydrochloric acid = 36 percent. Sodium nitrite is the preferred alkali nitrite for use. Apart from copper in the form of copper bronze, both cuprous chloride and cupric chlorice may be used for decomposing the diazonium salt, also copper bromide. Concentrated hydrochloric acid or concentrated hydrobromic acid may serve as a reaction medium for the diazotization and subsequent decomposition of the diazonium salt.

The following oxidising agents can be used for oxidising the thio-bridge to a sulfinyl or sulfonyl group: gaseous chlorine in an aqueous medium, hydrogen peroxide, organic per acids such as monoperphthalic acid, performic acid, perbenzoic acid, trifluoroperacetic acid, and inorganic per acids or their salts such as Caro's acid, peroxisulphuric acid and its salts, perchloric acid and its salts, potassium permanganate, sodium iodate, and mercuric acetate. Chlorine gas in water is the preferred oxidising agent for oxidising the thio-bridge to a sulfonyl group. For oxidation of the thio-bridge to a sulfinyl group, equivalent quantities of hydrogen peroxide are preferably used and the reaction is carried out in glacial acetic acid. The peracids noted can be introduced into the reaction as such or they can be produced in the reaction zone from hydrogen peroxide and the corresponding acids, optionally in the presence of a catalyst, for example a mineral acid. It is generally satisfactory to use the oxidising agent in equimolecular proportions. The sulfinyl compounds obtained from the thio derivatives can, if desired, be oxidised to sulfonyl compounds.

Reaction temperatures for the diazotization generally lie in the range of −20° to +20°C and for the decomposition of the diazonium halide between +20° and 120°C. Oxidations with chlorine gas in water are preferably carried out at 20° − 35°C while oxidation with hydrogen peroxide in acetic acid is preferably carried out at 20° − 80°C.

The oxidations are carried out in the presence of a solvent or diluent inert with respect to the reactants. For this, there are for example water, acetic acid, ketones such as acetone and methylethyl ketone, ethers such as diethylether, halo hydrocarbons such as chloroform, carbontetrachloride, and trichlorethylene, as well as aromatic hydrocarbons such as benzene, toluene, and xylene.

The 2-halo-1,3,4-thiadiazoles of formula I obtained by the process described are stable compounds which are insoluble in water and well soluble in the normal organic solvent media such as alcohols, ketones and ethers. For introducing the chlorine atom into the two-position of the 1,3,4-thiadiazole, either a 2-mercapto-1,3,4-thiadiazole may be reacted with thionylchloride, or a 5-R-X-substituted 2-mercapto-1,3,4-thiadiazole may be treated with chlorine gas. In the latter case the 5-sulfonyl-2-chloro-1,3,4-thiadiazole is obtained directly. The introduction of bromine by means of $Br_2$ into a 5-R-X-1,3,4-thiadiazole is likewise possible.

The starting materials of formula II can be manufactured by known processes, for example by the reaction of a correspondingly substituted thiosemicarbazide with carbon disulphide in pyridine; the resulting 2-amino-5-mercapto-1,3,4-thiadiazole is then reacted with a compound of the formula R-Hal.

Examples of starting materials of formula II include:

| Compound | Melting point |
| --- | --- |
| 5-n-butylthio-2-amino-1,3,4-thiadiazole | 117–119°C |
| 5-methylthio-2-amino-1,3,4-thiadiazole | 117°C |
| 5-n-hexalthio-2-amino-1,3,4-thiadiazole | 109–111°C |
| 5-(2'-chloroallylthio)-2-amino-1,3,4-thiadiazole | 140–141°C |
| 5-ethylthio-2-amino-1,3,4-thiadiazole | 133–135°C |
| 5-isopropylthio-2-amino-1,3,4-thiadiazole | 143–145°C |
| 5-ethoxyethylthio-2-amino-1,3,4-thiadiazole | 100–102°C |
| 5-cyclopentylthio-2-amino-1,3,4-thiadiazole | 170–172°C |
| 5-isoamylthio-2-amino-1,3,4-thiadiazole | 131–133°C |

The following example will serve to illustrate the manufacturing process. Further 2-halo-1,3,4-thiadiazoles of formula I obtained in this fashion are set forth in the subsequent table. Unless otherwise stated, temperatures are in °C and pressure in torr.

EXAMPLE 1

40 g of 5-n-butylthio-2-amino-1,3,4-thiadiazole (M.pt. 117°–119°) and 7 g. copper bronze were suspended in 500 ml concentrated hydrochloric acid and were cooled to −10°. 60 g sodium nitrite were then added in portions with good stirring into the mixture so that the temperature remained below 0°. Stirring was continued for a further 3 hours at 0° and then for 2½ hours at 80°. After cooling, the oil which separated out was extracted with chloroform and the chloroform phase washed first with 100 ml ice-cold 5 percent caustic soda and then with cold water and then dried over sodium sulphate. After evaporation of the chloroform the residue was distilled in vacuo. 28 g. 5-n-butyl-thio-2-chloro-1,3,4-thiadiazole were obtained with a boiling point of 85° – 86°/0.1; $n_{20}^D = 1.5740$.

28 g. 5-n-butylthio-2-chloro-1,3,4-thiadiazole were suspended in 200 ml water and treated for 3 hours with vigorous stirring at 0° to 15° with chlorine gas. The product which crystallised out during the reaction was filtered off, dissolved in ether and dried over magnesium sulphate. After evaporation of the ether the residue was distilled in vacuo. 23 g. 5-n-butylsulfonyl-2-chloro-1,3,4-thiadiazole were obtained with a boiling point of 140°/0.06 and a melting point of 40.5° to 41.5°.

The starting material, the 5-n-butylthio-2-amino-1,3,4-thiadiazole, was obtained by alkylating the known 5-mercapto-1,3,4-thiadiazole with n-butyl bromide.

| Compound | melting point/boiling point |
| --- | --- |
| 5-Methylthio-2-chlor-1,3,4-thiadiazole | 122°/14 |
| 5-n-Hexylthio-2-chlor-1,3,4-thiadiazole | 91°–95°/0,001 |
| 5-(2'-Chlorallylthio)-2-chlor-1,3,4-thiadiazole | 114°–115°/0,1 |
| 5-Methylthio-2-chlor-1,3,4-thiadiazole | 60°–65°/0,001 |
| 5-Isopropylthio-2-chlor-1,3,4-thiadiazole | 63°–66°/0,02 |
| 5-Methoxy ethylthio-2-chlor-1,3,4-thiadiazole | 81°–83°/0,04 |
| 5-Cyclopentylthio-2-chlor-1,3,4-thiadiazole | 105°/0,03 |
| 5-Isoamylthio-2-chlor-1,3,4-thiadiazole | 86°–88°/0,04 |
| 5-n-Butylthio-2-brom-1,3,4-thiadiazole | 104°/0,01 |
| 5-n-Butylsulfinyl-2-chlor-1,3,4-thiadiazole | 10°–11° |

The new 2-halo-1,3,4-thiadiazoles of formula I are exceptionally suitable for combating pests arising in the soil. Amongst these soil pests are nematodes, moulds, insects and development stages of insects.

Thus the novel active agents can be used, for example, to combat the following nematodes:
Meloidogyne spp., Heterodera spp., Ditylenchus spp., Pratylenchus spp., Paratylenchus spp., Anguina spp., Helicotylenchus spp., Tylenchorhynchus spp., Rotylenchulus spp., Tylenchulus semipenetrans, Radopholus similis, Belono laimus spp., Trichodorus spp., Longidorus spp., Aphelenchoides spp., Xiphinema spp., Rhadinaphelenchus spp.

Earth fungi, the growth of which is inhibited or hindered by the novel active agents belong, for example, to the following types:
Fusarium spp., Verticillium spp., Pythium spp., Phytophthora spp., Sclerotium spp., Sclerotinia spp., Rosellinia spp., Plasmodiophora spp., Aphanomyces spp., Ophiobulus spp., Rhizoctonia spp., Thielaviopsis spp., Phialophora spp., etc.

The novel active substances can furthermore be used for combating development stages (larval stages) of various beetles and flies, as well as for combating various termite types, various sucking insects, mole crickets, etc.

In admixture with synergists and similarly active adjuvants such as the dibutyl ester of succinic acid, piperonylbutoxide, olive oil, ground nut oil, etc., the spectrum of activity of the active agents according to the invention may be broadened. Similarly the action may be broadened by the addition of other biocidal compounds such as, for example, phosphoric acid, phosphonic acid, thio and dithio phosphoric acid esters and amides, carbamic acid esters, halo hydrocarbons, and analogues of DDT active substances, together with pyrethrins and their synergists, and other acaridical active substances such as halobenzilic acid esters such as 4,4'-dichlorobenzilic acid ester, 4,4'-dibromobenzilic acid esters, insecticidal and acaricidal carbamates, for example oxime carbamates, aryl carbamates and carbamates of enolizable heterocyclic compounds.

Examples of such biocidal compounds are the following:

PHOSPHORIC ACID DERIVATIVES:

Bis-0,0-diethylphosphoric anhydride (TEPP)
0,0,0,0-Tetrapropyldithiopyrophosphate
Dimethyl(2,2,2-trichloro-1-hydroxyethyl)phosphonate(TRICHRORFON)
1,2-Dibromo-2,2-dichloroethyldimethylphosphate (NALED)
2,2-Dichlorovinyldimethylphosphate (DICHLORFOS)
2-Methoxycarbamyl-1-methylvinyldimethylphosphate (MEVINPHOS)
Dimethyl-1-methyl-2-(methylcarbamol) vinylphosphate cis (MONOCROTOPHOS)
3-(Dimethoxyphosphinyloxy)-N-methyl-N-methoxy-cis-crotonamide
3-(Dimethoxyphosphinyloxy)-N,N-dimethyl-cis-crotonamide (DIGROTOPHOS)
2-Chloro-2-diethylcarbamoyl-1-methylvinyldimethylphosphate (PHOSPHAMIDON)
0,0-Diethyl-O-2(ethylthio)-ethylthiophosphate (DEMETON)
0,0-Diethyl-S-2-(ethylthio)-ethylthiophosphate
S-Ethylthioethyl-0,0-dimethyl-dithiophosphate (THIOMETON)
0,0-Diethyl-S-ethylmercaptomethyldithiophosphate (PHORATE)
0,0-Diethyl-S-2-[(ethylthio)ethyl] dithiophosphate (DISULFOTON)
0,0-Dimethyl-S-2(ethylsulfinyl)ethylthiophosphate (OXYDEMETONMETHYL)
0,0-Dimethyl-S-(1,2-dicarbethoxyethyl)dithiophosphate (MALATHION)
(0,0,0,0-Tetraethyl-S,S'-methylene-bis[dithiophosphate] (ETHION)
0-ethyl-S,S-dipropyldithiophosphate
0,0-Dimethyl-S-(N-methyl-N-formylcarbamoylmethyl)-dithiophosphate (FORMOTION)
O,O-Dimethyl-S-(N-methylcarbamoylmethyl)dithiophosphate (DIMETHAT)
O,O-Dimethyl-S-(N-ethylcarbamoylmethyl)dithiophosphate (ETHOAT-METHYL)
O,O-Diethyl-S-(N-isopropylcarbamoylmethyl)-dithiophosphate (PROTHOAT)
S-N-(1-Cyano-1-methylethyl)carbamoylmethyldiethyl-thiolphosphate (CYANTHOAT)
S-(2-Acetamidoethyl)-O,O-dimethyldithiophosphate
Hexamethylphosphoric acid triamide (HEMPA)

O,O-Dimethyl-O-p-nitrophenylthiophosphate (PARATHION-METHYL)
O,O-Diethyl-O-p-nitrophenylthiophosphate (PARATHION)
O-ethyl-O-p-nitrophenylphenylthiophosphonate (EPN)
O,O-Dimethyl-O-(4-nitro-m-tolyl)thiophosphate (FENITROTHION)
O,O-Dimethyl-O-(2-chlor-4-nitrophenyl)thiophosphate (DICAPTHON)
O,O-Dimethyl-O-p-cyanophenylthiophosphate (CYANOX)
O-ethyl-O-p-cyanophenylphenylthiophosphonate
O,O-Diethyl-O-2,4-dichlorphenylthiophosphate (DICHROFENTHION)
O-2,4-Dichlorphenyl-O-methylisopropylamidothiophosphate
O,O-Dimethyl-O-2,4,5-trichlorphenylthiophosphate (RONNEL)
O-ethyl-O-2,4,5-trichlorphenylethylthiophosphonate (TRICHLORONAT)
O,O-Dimethyl-O-2,5-dichlor-4-bromphenylthiophosphate (BROMOPHOS)
O,O-Diethyl-O-2,5-dichlor-4-bromphenylthiophosphate (BROMOPHOS-AETHYL)
O,O-Dimethyl-O-(2,5-dichlor-4-iodiphenyl)-thiophosphate (IODOFENPHOS)
4-tert.Butyl-2-chlorphenyl-N-methyl-O-methylamidophosphate (CRUFOMAT)
Dimethyl-p-(methylthio)phenylphosphate
O,O-Dimethyl-O-(3-methyl-4-methylmercaptophenyl)thiophosphate (FENTHION)
Isopropylamino-O-ethyl-O-(4-methylmercapto-3-methylphenyl)-phosphate
O,O-Diethyl-O-p-[(methylsulfinyl)phenyl]-thiophosphate (FENSULFOTHION)
O,O-Dimethyl-O-p-sulfamidophenylthiophosphate
O-[p-(Dimethylsulfamido)phenyl]O,O-dimethylthiophosphate (FAMPHUR)
O,O,O',O'-Tetramethyl-O,O'-thiodi-p-phenylenthiophosphate
O-(p-(p-Chlorphenyl)azaphenyl)O,O-dimethylthiophosphate (AZOTHOAT)
O-ethyl-S-phenyl-ethyldithiophosphonate
O-ethyl-S-4-chlorphenyl-ethyldithiophosphonate
O-Isobutyl-S-p-chlorphenyl-ethyldithiophosphonate
O,O-Dimethyl-S-p-chlorophenylthiophosphate
O,O-Dimethyl-S-(p-chlorphenylthiomethyl)-dithiophosphate
O,O-Diethyl-p-chlrophenylmercaptomethyl-dithiophosphate (CARBOPHENOTHION)
O,O-Diethyl-S-p-chlorphenylthiomethyl-thiophosphate
O,O-Dimethyl-S-(carbethoxy-phenylmethyl)dithiophosphate (PHENOTHOAT)
O,O-Diethyl-S-(carbofluorethoxy-phenylmethyl)-dithiophosphate
O,O-Dimethyl-S-(carboisopropoxy-phenylmethyl)-dithiophosphate
O,O-Dimethyl-O-(alpha-methylbenzyl-3-hydroxycrotonyl)phosphate
2-Chlor-1-(2,4-dichlorphenyl)vinyl-diethylphosphate (CHLORFENVINPHOS)
2-Chlor-1-(2,4,5-trichlorphenyl)vinyl-dimethylphosphate
0-(2-Chlor-1-(2,5-dichlorphenyl)vinyl)-O,O-diethyl-thiophosphate Phenylglyoxylonitriloxim-O,O-diethylthiophosphate (PHOXIM)
O,O-Diethyl-O-(3-chlor-4-methyl-2-oxo-2-H-1-benzopyran-7-yl)-thiophosphate (COUMAPHOS)
O,O-Diethyl-7-hydroxy-3,4-tetramethylen-coummarinyl-thiophosphate (COUMITHOAT)
2,3-p-Dioxandithiol-S,S-bis(O,O-diethyldithiophosphate) (DIOXATHION)
2-Methoxy-4-H-1,3,2-benzodioxaphosphorin-2-sulfide
O,O-Diethyl-O-(5-phenyl-3-isooxyzolyl)thiophosphate
S-[(6-Chlor-2-oxo-3-benzoxazolinyl)methyl]O,O-diethyldithiophosphate (PHOSALON)
2-(Diethoxyphosphinylimino)-4-methyl-1,3-dithiolane
O,O-Dimethyl-S-[2-methoxy-1,3,4-thiadiazol-5-(4H)-onyl-(4)-methyl]dithiophosphate
Tris-(2-methyl-1-aziridinyl)-phosphineoxide (METEPA)
O,O-Dimethyl-S-phthalimidomethyl-dithiophosphate
S-(2-Chlor-1-phthalimidoethyl)-O,O-diethyldithiophosphat
N-Hydroxynaphthalimido-diethylphosphate
Dimethyl-3,5,6-trichlor-2-pyridylphosphate
O,O-Dimethyl-O-(3,5,6-trichlor-2-pyridyl)thiophosphate
O,O-Diethyl-O-(3,5,6-trichlor-2-pyridyl)thiophosphate
O,O-Diethyl-O-2-pyrazinylthiophosphate (THIONAZIN)
O,O-Diethyl-(2-isopropyl-4-methyl-6-pyrimidyl)thiophosphate (DIAZINON)
O,O-Diethyl-O-(2-chinoxylyl)thiophosphate
O,O-Dimethyl-S-(4-oxo-1,2,3-benzotriazin-3(4H)-ylmethyl)-dithiophosphate (AZINPHOSMETHYL)
O,O-Diethyl-S-(4-oxo-1,2,3-benzotriazin-3(4H-ylmethyl)-dithiophosphate (AZINPHOS ETHYL)
S-[(4,6-Diamino-s-triazin-2-yl)methyl]-O,O-dimethyldithiophosphate (MENAZON)
S-[2-(ethylsulfonyl)ethyl]dimethylthiolphosphate (DIOXYDEMETON-S-METHYL)
Diethyl-S-[2-(ethylsulfinyl)ethyl]dithiophosphate (OXYDISULFOTON)
Bis-O,O-diethylthiophosphoric acid anhydride (SULFOTEP)
Dimethyl-1,3-di(carbomethoxy)-1-propen-2-yl-phosphate
Dimethyl-(2,2,2-trichlor-1-butyroyloxyethyl)phosphonate (BUTOMAT)
O,O-Dimethyl-O-(2,2-dichlor-1-methoxyvinyl)phosphate
O,O-Dimethyl-O-(3-chlor-4-nitrophenyl)thiophosphate (CHLORTHION)
O,O-Dimethyl-O(or S)-2-(ethylthioethyl)thiophosphate (DEMETON-S-METHYL)
Bis-(dimethylamido)fluorophosphate (DIMEFOX)
2-(O,O-Dimethyl-phosphoryl-thiomethyl)-5-methoxypyron-4
3,4-dichlorbenzyl-triphenylphosphonium chloride
Dimethyl-N-methoxymethylcarbamoylmethyl-dithiophosphate (FORMOCARBAM)
O,O-Diethyl-O-(2,2-dichlor-1-chlorethoxyvinyl)phosphate
O,O-Dimethyl-O-(2,2-dichlor-1-chlorethoxyvinyl)-phosphate
O-ethyl-S,S--diphenyldithiolphosphate
O-ethyl-S-benzyl-phenyldithiophosphonate
O,O-Diethyl-S-benzyl-thiolphosphate O,O-Dimethyl-S-(4-chlorphenylthiomethyl)dithiophosphate (METHYLCARBOPHENOTHION)
O,O-Dimethyl-S-(ethylthiomethyl)dithiophosphate
Diisopropylaminofluorphosphate (MIPAFOX)
O,O-Dimethyl-S-(morpholinylcarbamoylmethyl)dithiophosphate (MORPHOTHION)
Bismethylamido-phenylphosphate
O,O-Dimethyl-S-(benzoylsulfonyl)dithiophosphate
O,O-Dimethyl-(S and O)-ethylsulfinylethylthiophosphate
O,O-Diethyl-O-4-nitrophenylphosphate
O,O-Diethyl-S-(2,5-dichlorphenylthiomethyl)dithiophosphate (PHENDAPTON)
Triethoxy-isopropoxy-bis (thiophosphinyl)disulfide
O,O-Diethyl-O-(4-methyl-cumarinyl-7)-thiophosphate (POTASAN)
2-Methoxy-4H-1,3,2-benzodioxaphosphorin-2-oxide
Octamethylpyrophosphoramide (SCHRADAN)
Bis(dimethoxythiophosphinylsulfido)-phenylmethane
5-Amino-bis(dimethylamido)phosphinyl-3-phenyl-1,2,4-triazole (TRIAMIPHOS)
N-Methyl-5-(O,O-dimethylthiolphosphoryl)-thiavaleramide (VAMIDOTHION)

CARBAMIC ACID DERIVATIVES

1-Naphthyl-N-methylcarbamate (CARBARYL)
2-Butinyl-4-chlorophenylcarbamate
4-Dimethylamino-3,5-xylyl-N-methylcarbamate
4-Dimethylamino-3-tolyl-N-methylcarbamate (AMINOCARB)
4-Methylthio-3,5xylyl-N-methylcarbamate (METHIOCARB)
3,4,5-Trimethylphenyl-N-methylcarbamate
2-Chlorphenyl-N-methylcarbamate (CPMC)
5-Chloro-6-oxo-2-norbornan-carbonitril-O-(methylcarbamoyl)-oxime
1-(Dimethylcarbamoyl)-5-methyl-3-pyrazolyl-N,N-dimethylcarbamate (DIMETILAN)
2,3-Dihydro-2,2,-dimethyl-7-benzofuranyl-N-methylcarbamate (CARBOFURAN)
2-Methyl-2-methylthio-propionaldehyd-O-(methylcarbamoyl)-oxime (ALDICARB)
8-Quinaldyl-N-methylcarbamate and its salts
Methyl 2-isopropyl-4-(methylcarbamoyloxy)carbanilate
m-(1-ethylpropyl)phenyl-N-methylcarbamate
3,5-Di-tert.butyl-N-methylcarbamate
m-(1-Methylbutyl)phenyl-N-methylcarbamate
2-Isopropylphenyl-N-methylcarbamate
2-sec.Butylphenyl-N-methylcarbamate
m-Tolyl-N-methylcarbamate
2,3-Xylyl-N-methylcarbamate
3-Isopropylphenyl-N-methylcarbamate
3-tert.Butylphenyl-N-methylcarbamate
3-sec.-Butylphenyl-N-methylcarbamate
3-Isopropyl-5-methylphenyl-N-methylcarbamate (PROMECARB)
3,5-Diisopropylphenyl-N-methylcarbamate
2-Chlor-5-isopropylphenyl-N-methylcarbamate
2-Chlor-4,5-dimethylphenyl-N-methylcarbamate
2-(1,3-Dioxolan-2-yl)phenyl-N-methylcarbamate (DIOXACARB)
2-(4,5-Dimethyl-1,3-dioxolan-2-yl)phenyl-N-methylcarbamate
2-(1,3-Dioxan-2-yl)phenyl-N-methylcarbamate
2-(1,3-Dithiolan-2-yl)phenyl-N-methylcarbamate
2-(1,3-Dithiolan-2-yl)phenyl-N,N-dimethylcarbamate
2-Isopropoxyphenyl-N-methylcarbamate (ARPROCARB)
2-(2-Propinyloxy)phenyl-N-methylcarbamate
3-(2-Propinyloxy)phenyl-N-methylcarbamate
2-Dimethylaminophenyl-N-methylcarbamate
2-Diallylaminophenyl-N-methylcarbamate
4-Diallylamino-3,5-Xylyl-N-methylcarbamate (ALLYXICARB)
4-Benzothienyl-N-methylcarbamate
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate (ISOLAN)
2-(N',N'-Dimethylcarbamoyl)-methylpyrazol-5-yl-N,N-dimethylcarbamate
2-Dimethylamino-5,6-dimethylpyrimidin-4-yl-N,N-dimethylcarbamate
3-Methyl-4-dimethylaminomethyleniminophenyl-N-methylcarbamate
3-Dimethylamino-methyleniminophenyl-N-methylcarbamate
1-Methylthio-ethylimino-N-methylcarbamate (METHOMYL)
2-Methylcarbamoyloxyimino-1,3-dithiolane
5-Methyl-2-methylcarbamoyloximino-1,3-oxathiolane
2-(1-Methoxy-2-propoxy)phenyl-N-methylcarbamate
2-(1-Butin-3-yl-oxy)phenyl-N-methylcarbamate
3-Methyl-4-(dimethylamino-methylmercapto-methylenimino)phenyl-N-methylcarbamate
1,3-Bis(carbamoylthio)-2-(N,N-dimethylamino)-propane hydrochloride
5,5,-Dimethylhydroresorcinoldimethylcarbamate
2-[Propargylethylamino]-phenyl-N-methylcarbamate
2-[Propargylmethylamino]-phenyl-N-methylcarbamate
2-[Dipropargylamino]-phenyl-N-methylcarbamate
3-Methyl-4-[dipropargylamino]-phenyl-N-methylcarbamate
3,5-Dimethyl-4-[dipropargylamino]-phenyl-N-methylcarbamate
2-[Allyl-isopropylamino]-phenyl-N-methylcarbamate
3-[Allyl-isopropylamino]-phenyl-N-methylcarbamate

| Chlorinated Hydrocarbons | |
|---|---|
| γ-Hexachlorocyclohexana | [Gammexan; Lindan;γHCH] |
| 1,2,4,5,6,7,8,8-Octachloro, 3α, 4,7-methyleneindane | 4,7,7α'tetrahydro-[Chlordan] |
| 1,4,5,6,7,8,8-Heptachloro, 3α 4,7-methyleneindance | 4,7,7α-tetrahydro [Heptachlor] |
| 1,2,3,4,10,10- hexachlor-1,4,4α endo-1,4-exo-5,8-dimethanonaphthaline | 5,8,8α-hexahydro-[Aldrin] |
| 1,2,3,4,10,10- hexachlor-6,7-expoxy-1,4,4α,5,6,7,8,8α-octahydro-exo-1,4-endo-5,8-dimethanonaphthaline | [Dieldrin] |
| do, endo-endo,- | [Endrin] |

6,7,8,9,10,10-hexachloro-1,5,5α,6,9,9α-hexahydro-6,9-methano-2,3,4 benzo[e]-dioxa-thiepen-3 oxide [Endosulfan]
Chlorinated camphor
Decachloroctahydro-1,3,4-metheno-2H-cyclobuta[e d] pentalene-2-one
Dodecachloroctahydro-1,3,4-metheno-1H-cyclobuta[c d] pentalene [Mirex]

ethyl 1, 1α,3,3α,4,5,5α,5α 6 decachloroctahydro-2-hydroxy-1,3,4-metheno-1H-cyclobuta[c d] pentalene-2-laevulinate
Bis(pentachlor-2,4-cyclopentadien-1-yl)
Dinoctone-o
1,1,1-Trichlor-2,2-bis(p-Chlorphenyl)ethane[DDT]
Dichlordiphenyl-dichlorethane [TDE]
di(p-chlorphenyl)-trichlormethycarbinol [Dicofol]
ethyl-4,4'dichlorophenylglycolate [Chlorbenzylat]
ethyl-4,4'dibromobenzylate [Brombenzylat]
Isopropyl-4,4'dichlorbenzylate
1,1,1-Trichlor-2,2,bis-(p-methoxyphenyl)ethane [Methoxychlor]
Diethyl-diphenyl-dichloroethane
Decachlorpentacyclo(3,3,2 $O^{2,6}$, $O^{3,9}$, $O^{7,10}$)decan-4-one
[Chlorodecon]

NITROPHENOLS & DERIVATIVES 4,6-Dinitro,6-methylphenol, Ma-salt [Dinitrocresol]
Dinitrobutylphenol 2,2',2'' triethanolamine salt
2 Cyclohexyl-4,6-Dinitrophenol [Dinex]
2-(1-Methylheptyl)-4,6 dinitrophenyl-crotonate [Dinocap]
2 sec.-butyl-4,6-dinitrophenyl-3-methyl-butenoate [Binapacryl]
2 sec.-butyl-4,6-dinitrophenyl-cyclopropionate
2 sec.-butyl-4,6-dinitrophenyl-isopropyl-carbonate [Dinobuton]

Various

Sabadilla
Rotenon
Cevadin
Veratridin
Ryania
Pyrethrin
3-Allyl-2-methyl-4-oxo-2-cyclopenten-1-yl-chrysanthemumate
(Allethrin)
6-chlropiperonyl-chrysanthemumate (barthrin)
2,4-dimethylbenzyl-chrysanthemumate (dimethrin)
2,3,4,5-tetrahydrophthalimidomethylchrysanthemumate
(5-benzyl-3-furyl)-methyl-2,2-dimethyl-3-(2-methylpropanyl)-cyclopropancarboxylate
Nicotine
Bacillus thuringiensis Berliner
Dicyclohexylcarbodiimide
Diphenyldiimide [Azobenzol]
4-Chlorbenzyl-4-chlorphenylsulfide [Chlorbensid] creosote oil
6-Methyl-2-oxo-1,3-dithiolo-[4,5-b]-quinoxaline [Quinomethionat]
(I)-3-(2-Furfuryl)-2-methyl-4-oxocyclopent-2-enyl(I)-cistrans) chysanthemum-monocarboxylate[Furethrin]
2-Pivaloyl-indan-1,3-dione [Pindon]
2-Fluoroethyl (4-bisphenyl)acetate
2-Fluor-N-methyl-N(1-naphthyl)-acetamide
Pentachlorphenol and salts
2,2,2-Trichlor-N-(pentachlorphenyl)-acetimidoyl chloride
N'-(4-chlor-2-methylphenyl)-N,N-dimethylformamidine(Chlorphenamidin)
4-Chlorbenzyl-4-fluorophenyl-sulfide(Fluorbenside)
5,6-Dichlor-1-phenoxycarbanyl-2-trifluormethyl-benzimidazole
(Fenozaflor)
Tricyclohexyl tin hydroxide
2-thiocyanoethyl-lauric acid ester
β-Butoxy-β'-thiocyanodiethylether
Isobornyl-thiocyanoacetate
p-Chlorphenyl-p-chlorbenzene sulfonate (Ovex)
2,4-Dichlorphenyl-benzene sulfonate
p-Chlorphenyl-benzene sulfonate (Fenson)
p-Chlorphenyl-2,4-5-trichlorphenylsulfone (Tetradifon)
p-Chlorphenyl-2,4,5-trichlorphenylsulfide (Tetrasul)
Methyl bromide
p-Chlorphenyl-phenylsulfone
p-Chlorbenzyl-p-chlorphenylsulfide (Chlorbenside)
4-Chlorphenyl-2,4-5-trichlorphenylazosulfide
2(p-tert.-Butylpehnoxy)1-methylethyl-2-chlorethyl-sulfite
2-(p-tert.-Butylpehnoxy)cyclohexyl-2-propinyl-sulfite
4,4'-Dichlor-N-methylbenzolsulfonanilide
N-(2-Fluor-1,1,2,2-tetrachloroethylthio)-methanesulfonanilide
2-Thio-1,3,dithiolo-(4,5-6)quinoxaline(Thiochinox)
Chlormethyl-p-chlorphenylsulfone (lause to new)
1,3,6,8Tetranitrocarbazole
Prop-2-ynyl-(4-t-butylphenoxy)-cyclohexylsulfite
(Propargil)

The new active substances can be used for combating soil pests in the form of a solid or liquid agent. For application to the soil, agents are particularly advantageous which ensure an even distribution of the active substance over a soil surface layer 15–25 cm deep. The particular application method and application form are particularly dependant upon the type of soil pests to be combated, the climate and the soil conditions. Since the new active substances are not phytotoxic and do not adversely influence germination, they can be used directly before or after sowing the plants without having to observe any so-called waiting period. Likewise, already existing plant cultures can be treated with the new active substances. Furthermore, application of the active substance can also take place on above ground plant parts.

In German Patent specification No. 1016409, 2-amino-5-bromo-1,3,4-thiadiazoles and 5-alkylthio-1,3,4-thiadiazoles are mentioned as additives to tetracycline fermentation media. The novel 2-halo-1,3,4-thiadiazoles are, however, not previously described before this. From the range of 1,3,4-thiadiazoles however, various derivatives are known as nematocides, e.g. 2-halo-methyl-5-alkylthio-1,3,4thiadiazoles and 2-alkyl-5-alkylthio-1,3,4-thiadiazoles, see Swiss Patent Specifications Nos. 413483 and 464212, as well as 2,5,-bis-alkylthio-1,3,4-thiadiazoles, see Austrian Patent Specification 196169. In the following tests, compounds included in the Patent Specifications just noted are used as comparison compounds. These compounds possess both an insufficient nematocidal and soil fungicidal action as well as a higher warm blooded toxicity:

| Compound | $LD_{50}$ for rats p.o. |
|---|---|
| 2,5,-bis-ethylthio -1,3,4-thiadiazole (known loc. cit.) | 240 mg/kg |
| 2-chloromethyl-5-ethylthio-1,3,4-thiadiazole (known loc. cit.) | 129 mg/kg |
| 2-chloro-5-n-butylthio-1,3,4-thia- | |

-Continued

| Compound | L.D.$_{50}$ for rats p.o. |
|---|---|
| diazole (according to the present invention) | 620 mg/kg |
| 2-chloro-5-methylthio-1,3,4-thiadiazole (according to the present invention) | >5000 mg/kg |

NEMATOCIDE-TEST

For testing the action against earth nematodes, the active substance is added in given concentration to earth infected by root knot nematodes (Meloidogyne arenaria) and intimately mixed. In test row A (table I), tomato seedlings were planted into the so prepared earth immediately thereafter, and in test row B (table II) after an 8 day waiting period tomatoes were sown.

For determining the nematocidal action, the root knots were counted after 28 days from planting or sowing.

Evaluation scale:  0 = full nematocidal action
  = no attack
  5 = no nematocidal action
  = same attack as control plants
  2–4 = intermediate stages of attack

TABLE 1

Test Row A
Concentration: 50 ppm "X" ppm = "X" parts of active substance per 10$^6$ parts of diluent.

| Active substance | Nematocidal action |
|---|---|
| 5-n-butylthio-2-chlor-1,3,4-thiadiazole | 2 |
| 5-ethylthio-2-chlor-1,3,4-thiadiazole | 2 |
| 5-isopropylthio-2-chlor-1,3,4-thiadiazole | 0 |
| 5-ethoxyethylthio-2-chlor-1,3,4-thiadiazole | 2 |
| 5-ethylthio-2-methyl-1,3,4-thiadiazole (known from Swiss Patent Specification No. 413.483) | 5 |

TABLE 2

Test Row B
Concentration: 50 ppm

| Active substance | nematocidal action |
|---|---|
| 5-methylthio-2-chlor-1,3,4-thiadiazole | 1 |
| 5-n-butylthio-2-chlor-1,3,4-thiadiazole | 0 |
| 5-n-hexylthio-2-chlor-1,3,4-thiadiazole | 1 |
| 5-ethylthio-2-chlor-1,3,4-thiadiazole | 0 |
| 5-isopropylthio-2-chlor-1,3,4-thiadiazole | 0 |
| 5-ethoxyethylthio-2-chlor-1,3,4-thiadiazole | 0 |
| 5-cyclopentylthio-2-chlor-1,3,4-thiadiazole | 1 |
| 5-isoamylthio-2-chlor-1,3,4-thiadiazole | 1 |
| 5-n-butylthio-2-brom-1,3,4-thiadiazole | 1 |
| 5-n-butylsulfinyl-2-chlor-1,3,4-thiadiazole | 2 |
| 5-allylthio-2-chlormethyl-1,3,4-thiadiazole (known from Swiss Patent Specification No. 464,212) | 4 |

FUNGICIDE-TEST

Standard garden soil was dried at 120° in a hot air chamber and partially sterilized. Proportions of 400 ml were then intensively mixed with 4 g of active substance which was in the form of a sprayable powder (concentration 1000 ppm active substance) so that the test substance was homogeneously distributed in the soil sample.

The treated earth was divided into portions of 100 g into four transparent plastics containers each of 200 ml content. Each container was infected with the test fungi Sclerotinia sclerotiorum, Pythium debaryanum, Rhizoctonia solani and Verticillium albo-atrum. As an inoculum, sterilized oat grains were used which were grown over with the test moulds. The inoculum was produced by inoculating sterile grains in Erlenmeyer flasks and incubating for 5–8 days at 22°.

After mixing in the inoculum, the earth was moistened with sterile distilled water to a degree at which the mould could develop optimally. The containers were closed.

After an incubation time of 5 days at 23° it was determined whether or not Mycalia had developed from the grains.

Evaluation:  0 = no Mycelium development
  + = Mycelium development

TABLE 1

Test mould Pythium debaryanum

| Active Substance | Effect |
|---|---|
| 5-methylthio-2-chlor-1,3,4-thiadiazole | 0 |
| 5-n-butylthio-2-chlor-1,3,4-thiadiazole | 0 |
| 5-n-butylsulfonyl-2-chlor-1,3,4-thiadiazole | 0 |
| 5-(2'-chlorallylthio)-2-chlor-1,3,4-thiadiazole | 0 |
| 5-ethylthio-2-chlor-1,3,4-thiadiazole | 0 |
| 5-n-butylsulfinyl-2-chlor-1,3,4-thiadiazole | 0 |
| 2,5-bis-ethylthio-1,3,4-thiadiazole (known from Austrian Patent Specification No. 196169). | + |

TABLE 2

Test mould Rhizoctonia solani

| Active substance | Action |
|---|---|
| 5-methylthio-2-chlor-1,3,4-thiadiazole | 0 |
| 5-n-butylthio-2-chlor-1,3,4-thiadiazole | 0 |
| 5-n-butylsulfonyl-2-chlor-1,3,4-thiadiazole | 0 |
| 5-(2'-chlorallylthio)-2-chlor-1,3,4-thiadiazole | 0 |
| 5-ethylthio-2-chlor-1,3,4-thiadiazole | 0 |
| 5-isopropylthio-2-chlor-1,3,4-thiadiazole | 0 |
| 5-n-butylsulfinyl-2-chlor-1,3,4-thiadiazole | 0 |
| 2,5-bis-ethylthio-1,3,4-thiadiazole (known from Austrian Patent Specification 196169) | + |

TABLE 3

Test mould Sclerotinia sclerotiorum

| Active Substance | Action |
|---|---|
| 5-methylthio-2-chlor-1,3,4-thiadiazole | 0 |
| 5-n-butylthio-2-chlor-1,3,4-thiadiazole | 0 |
| 5-n-butylsulfonyl-2-chlor-1,3,4-thiadiazole | 0 |
| 2,5-bis-ethylthio-1,3,4-thiadiazole (known from Austrian Patent Specification No. 196169) | + |

TABLE 4

| Test mould Verticillium albo-atrum Active Substance | Action |
| --- | --- |
| 5-methylthio-2-chlor-1,3,4-thiadiazole | 0 |
| 5-n-butylthio-2-chlor-1,3,4-thiadiazole | 0 |
| 5-n-butylsulfonyl-2-chlor-1,3,4-thiadiazole | 0 |
| 5-ethylthio-2-chlor-1,3,4-thiadiazole | 0 |
| 5-n-butylsulfinyl-2-chlor-1,3,4-thiadiazole | 0 |
| 2,5-bis-ethylthio-1,3,4-thiadiazole (known from Austrian Patent Specification No. 196169) | + |

INSECTICIDE TEST

Dry earth was formed into a granulate with each particular substance with a concentration of 0.005 percent. After the addition of water and further mixing four plastics beakers (contents of about 100 ml) were each filled one-third with earth. Two were attached each with ten colorado beetle larvae (pre pupal stage) and two with ten stable fly larvae (pre pupal stage). The beakers were stored for 20 days at 20° and 70–80 percent relative humidity. Then the emergence rate was determined on the adult animals.

Evaluation: 0 = not effective (100% adults)
100 = effective (0% adults)

The manufacture of agents according to the invention takes place in manner known per se, by intimate mixing and milling of active substances of general formula I with suitable carrier materials, optionally with the addition of dispersing agents or solvents inert with respect to active substance. The active substances can be present and be used in the following use forms:
Solid use forms:
   Dusting agents, spreading agents, granulates, coated granulates, impregnated granulates, and homogeneous granulates;
Liquid use forms:
   a. Concentrates of active substance dispersable in water: sprayable powder, pastes, emulsions:
   b. solutions.

For the manufacture of solid use forms (dusting agents spreading agents, granulates), the active substance is mixed with solid carrier materials. Examples of such carrier materials are kaolin, talcum, bolus, loess, chalk, limestone, limestone gravel, ataclay, dolomite, diatomaceous earth, precipitated silica, alkaline earth metal silicates, sodium and potassium aluminium silicates (feldspars and mica), calcium and magnesium sulphates, magnesium oxide, ground plastics materials, fertilisers such as ammonium sulphate, ammonium phosphate, ammonium nitrate, urea, ground vegetable products such as crop flours, bark flour, wood flour, nutshell flour, cellulose powder, residues from plant extractions, and active carbon. These can either be used alone or in mixtures with one another.

The particle size of the carrier material for dusting agents is suitably up to about 0.1 mm, for tracking powders about 0.075 – 0.2 mm and for granulates 0.2 mm or more.

The concentration of active substance in solid use forms generally amounts to 0.5 to 80 percent by weight.

Furthermore there can be added to these mixtures, additives for stabilising the active substance and/or non-ionic, anion active and cation active materials which, for example, improve the adherence of the active substance to plants and plant parts (glues and adhesives) and/or give a better wetting (wetting agents) or dispersability (dispersants). As adhesives, the following may be given as examples: olein lime mixtures, cellulose derivatives (methyl cellulose, carboxymethyl cellulose), hydroxyethyleneglycol ethers of mono- and dialkyl phenols with 5–15 ethylene oxide groups per molecule and 8–9 carbon atoms in the alkyl group, lignin sulphonic acid, and the alkali and alkaline earth metal salts thereof, polyethylene glycol ethers (carbowaxes), fatty alcohol polyglycol ethers with 5–20 ethylene oxide groups per molecule and 8–18 carbon atoms in the fatty alcohol part, condensation products of ethylene oxide, propylene oxide, polyvinylpyrrolidone, polyvinyl alcohols, and condensation products of urea-formaldehyde as well as latex products.

Water dispersable active substance concentrates, i.e., wettable powders, pastes and emulsion concentrates, are agents which can be diluted with water to any desired concentration. They consist of active substance, carrier, optionally stabilising additives for the active substance, surface active substances, and anti-foaming agents and if desired, solvents. The active substance concentration in these materials amount to 5–80 percent.

Sprayable powders and pastes are obtained by mixing the active substance with dispersing agents and powdery carriers in suitable apparatus to homogeneity and milling them. As carrier materials there can be used, for example, those already mentioned relative to the solid use forms. In some cases it is advantageous to use mixtures of various carrier materials. As dispersing agents there can be used, for example; condensation products of sulphonated naphthaline and sulphonated naphthaline derivatives with formaldehyde, condensation products of naphthaline or naphthaline sulphonic acids with phenol and formaldehyde as well as alkali, ammonium, and alkaline earth salts of lignin sulphonic acid, and furthermore alkyl aryl sulphonates, alkali and alkaline earth metal salts of dibutylnaphthaline sul-

| Active Substance | Colorado beetle larvae Concentration: 50 ppm | stable flylarvae Concentration: 100 ppm |
| --- | --- | --- |
| 5-methylthio-2-chlor-1,3,4-thiadiazole | 100 | 100 |
| 5-(2'-chlorallylthio)-2-chlor-1,3,4-thiadiazole | | 100 |
| 5-ethylthio-2-chlor-1,3,4-thiadiazole | 100 | 100 |
| 5-isopropylthio-2-chlor-1,3,4-thiadiazole | 100 | 100 |
| 5-ethoxyethylthio-2-chlor-1,3,4-thiadiazole | | 95 |
| 5-cyclopentylthio-2-chlor-1,3,4-thiadiazole | 75 | | phonic acid, fatty alcohol sulphates such as salts of sulphated hexadecanols, heptadecanols, octadecanols, and salts of sulphated fatty alcohol glycol ethers, the sodium salt of oleylmethyl tauride ditertiaryacetyleneglycols, dialkyldilaurylammonium chloride and fatty acid alkali and alkaline earth metal salts.

Silicones are examples of suitable anti-foaming agents.

The active substances are so mixed with the above noted additives, ground, sieved and checked that in the sprayable powders, the solid portion has a particle size of 0.02 to 0.04 mm and for the pastes does not exceed 0.03 mm. For the manufacture of emulsion concentrates and pastes, dispersing agents, as have been set out in the foregoing paragraphs, are used together with organic solvents and water. As solvents, the following should be noted as examples: alcohols, benzene, xylene, toluene, dimethylsulfoxide, and mineral oil fractions boiling in the range of 120° to 350°. The solvent must be practically odourless, non-phytotoxic inert to the active substance and it should not be easily inflammable.

Furthermore, the materials according to the invention can be used in the form of solutions. For this, the active substance or more than one active substance of general formula I is dissolved in suitable organic solvents, solvent mixtures or water. As organic solvents, there can be used aliphatic and aromatic hydrocarbons, their chlorinated derivatives, alkyl naphthalines, mineral oils alone or as a mixture with one another. These solutions should contain the active substance at a concentration of 1–20 percent by weight.

Other biocidally active substances or agents may be mixed in with the agents according to the invention. Thus the novel agents can contain as well as the noted compounds of general formula I, for example, insecticides, fungicides, bactericides, fungistatic agents, bacteriostatic agents, or nematocides, all for increasing the spectrum of action. The agents according to the invention can furthermore contain plant fertilisers, trace elements etc.

Examples of use forms of the new active substances of general formula I are now described. Parts throughout are parts by weight.

Dusting Agent

For the manufacture of an a) 10 percent b) 5 percent and c) 2 percent dusting agent, the following materials were used:
a)
 10 parts 5-methylthio-2-chloro-1,3,4-thiadiazole
 5 parts finely divided silica
 85 parts talcum
b.
 5 parts 5-n-butylthio-2-chloro-1,3,4-thiadiazole
 95 parts talcum
c.
 2 parts 5-cyclopentylthio-2-chloro-1,3,4-thiadiazole
 1 part finely divided silica
 97 parts talcum.

The active substances were mixed and ground together with the carrier substances. The dusting agent obtained could be used, for example, for the treatment of seed beds.

TRACKING POWDER

For the manufacture of 20 percent tracking powder the following materials were used:
 20 parts 5-n-butylsulfonyl-2-chloro-1,3,4-thiadiazole
 1 part paraffin oil
 79 parts talcum.

The active substances were mixed and ground together with the carrier materials. The tracking powder so obtained could be used, for example, for treating the ground in vegetable cultures.

WETTABLE POWDER

For the manufacture of an a) 50 percent b) 40 percent c) 25 percent and d) 10 percent wettable powder, the following components were used:
a.
 50 parts 5-ethylthio-2-chloro-1,3,4-thiadiazole
 5 parts naphthalinesulphonic acid benzenesulphonic acid formaldehyde concentrate
 5 parts dibutylnaphthalinesulphonic acid
 5 parts champagne-chalk
 20 parts silica
 15 parts kaolin;
b)
 40 parts 5-isopropylthio-2-chloro-1,3,4-thiadiazole
 1 part dibutylnaphthalinesulphonic acid
 5 parts ligninsulphonic acid sodium salts
 2 parts 1:1 mixtures of champagne-chalk and hydroxyethyl cellulose
 30 parts kaolin
 22 parts sodium aluminium silicate;
c.
 25 parts 5-(2'-chloroallylthio)-2-chloro-1,3,4-thiadiazole,
 5 parts oleylmethyltauridesodium salt,
 2.5 parts naphthalinesulphonic acid formaldehyde condensate,
 0.5 parts carboxymethylcellulose,
 5 parts neutral potassium aluminium silicata,
 62 parts talcum;
d.
 10 parts 5-n-butylthio-2-chloro-1,3,4-thiadiazole
 1 part sodiumdibutylnaphthaline sulphonate,
 4 parts sodium salt of lignin sulphonic acids,
 2 parts hydroxymethylcellulose,
 10 parts sodium aluminium silicate,
 23 parts champagne-chalk,
 50 parts kaolin;

The active substances were intimately mixed with the additive materials in suitable mixers and then milled together on suitable mills and rolls. Wettable powders were obtained which could be diluted with water to give suspensions of any desired concentration. These suspensions could be used for example, on cotton, sugar beet, tobacco, citrus, banana, and crop cultures.

PASTES

For the manufacture of a 45 percent paste, the following materials were used:
 45 parts 5-n-butinylsulfinyl-2-chloro-1,3,4-thiadiazole,
 5 parts sodium aluminium silicate,
 14 parts cetylpolyglycolether with 8 mol ethyleneoxide,
 1 part cetylpolyglycolether with 5 mol ethylene oxide, 2 parts spindle oil,
10 parts polyethylene glycol,
23 parts water.

The active substance was intimately mixed with the additive materials in suitable apparatus for the purpose and milled. A paste was obtained from which suspensions of any desired concentration could be made by dilution with water. The suspensions were useful, for example, for treating ornamental plants, fruit trees and vegetable cultures.

EMULSIFIABLE CONCENTRATE

For the manufacture of a 10 percent emulsifiable concentrate
  10 parts 5-ethoxyethylthio-2-chloro-1,3,4-thiadiazole,
  5 parts precipitated silica,
  85 parts limestone grit,
were mixed together. This concentrate can be diluted with water to give emulsions of suitable concentration for plant protection. These aqueous emulsions can be used for example for treating potato and sugar beet cultures etc.

GRANULES

The following materials are used to manufacture 10 percent granules:
a.
  10 parts of 2-chloro-5-n-butylthio-1,3,4-thiadiazole
  4 parts of polyethylene glycol (Carbowax 400)
  2 parts of silica
  84 parts of limestone grit.

The active substance is finely ground and mixed with the lime grit; polyethylene glycol is then added and finally the light silica.

I claim:
1. 2-Halogeno-1,3,4-thiadiazoles of the formulae

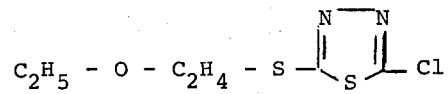

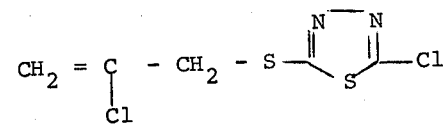

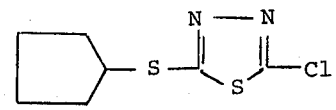

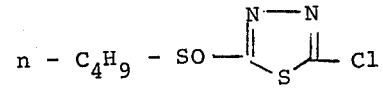

* * * * *